(12) United States Patent
Maruta et al.

(10) Patent No.: US 9,188,847 B2
(45) Date of Patent: Nov. 17, 2015

(54) SCREEN AND SCREEN MANUFACTURING METHOD

(71) Applicant: ARISAWA MFG. CO., LTD., Niigata (JP)

(72) Inventors: Hajime Maruta, Niigata (JP); Haruhisa Muro, Toyama (JP); Masatoshi Niwa, Niigata (JP)

(73) Assignee: ARISAWA MFG. CO., LTD., Niigata (JP)

( * ) Notice: Subject to any disclaimer, the term of this patent is extended or adjusted under 35 U.S.C. 154(b) by 0 days.

(21) Appl. No.: 14/303,556

(22) Filed: Jun. 12, 2014

(65) Prior Publication Data

US 2014/0293414 A1    Oct. 2, 2014

Related U.S. Application Data

(63) Continuation of application No. PCT/JP2011/006983, filed on Dec. 14, 2011.

(51) Int. Cl.
G03B 21/60    (2014.01)

(52) U.S. Cl.
CPC ...................................... G03B 21/60 (2013.01)

(58) Field of Classification Search
CPC ........................................................ G03B 21/60
USPC .................. 359/449, 459, 599, 707, 833–834
See application file for complete search history.

(56) References Cited

U.S. PATENT DOCUMENTS

| | | | | |
|---|---|---|---|---|
| 5,768,019 | A | * | 6/1998 | Niwa et al. ..................... 359/602 |
| 5,903,392 | A | * | 5/1999 | Kojima et al. ................. 359/599 |
| 5,914,825 | A | * | 6/1999 | Nishio et al. .................. 359/851 |
| 6,163,402 | A | * | 12/2000 | Chou et al. ..................... 359/443 |
| 6,421,174 | B1 | * | 7/2002 | Ooshima et al. .............. 359/457 |
| 7,262,911 | B2 | * | 8/2007 | Niwa et al. ..................... 359/459 |

(Continued)

FOREIGN PATENT DOCUMENTS

| | | |
|---|---|---|
| JP | S56-108128 U | 8/1981 |
| JP | H02-262134 A | 10/1990 |

(Continued)

OTHER PUBLICATIONS

International Preliminary Report on Patentability for International Application No. PCT/JP2011/006983, issued by the International Bureau of WIPO on Jun. 26, 2014.

(Continued)

*Primary Examiner* — Christ Mahoney

(57) ABSTRACT

Since a screen contains a diffusion agent, the diffusion agent changes polarization characteristics of picture light and degrades the stereoscopic image. Provided is a screen comprising a substrate shaped as a flat board; a reflective layer made of metal arranged on one surface of the substrate; and an exposure layer that is arranged on a surface of the reflective layer facing away from the substrate, is optically isotropic and transparent with respect to visible light, and has bumps and depressions formed in an exposed surface thereof. Also provided is a screen manufacturing method comprising providing a reflective layer on a substrate shaped as a flat board; and forming an exposure layer on a surface of the reflective layer facing away from the substrate, the exposure layer being optically isotropic and transparent with respect to visible light and having bumps and depressions formed in an exposed surface thereof.

12 Claims, 12 Drawing Sheets

(56) References Cited

U.S. PATENT DOCUMENTS

| | | | |
|---|---|---|---|
| 7,826,135 B2 * | 11/2010 | Destain et al. | 359/449 |
| 7,859,750 B2 * | 12/2010 | Akiyama | 359/454 |
| 8,400,714 B2 * | 3/2013 | Howe | 359/627 |
| 2002/0163719 A1 * | 11/2002 | Ma et al. | 359/443 |
| 2005/0141091 A1 | 6/2005 | Maruta et al. | |
| 2005/0200952 A1 | 9/2005 | Niwa et al. | |
| 2007/0229950 A1 * | 10/2007 | Ouderkirk et al. | 359/454 |
| 2008/0151556 A1 * | 6/2008 | Kiso et al. | 362/341 |
| 2010/0103513 A1 * | 4/2010 | Chuang et al. | 359/449 |
| 2012/0154908 A1 * | 6/2012 | Kitabayashi | 359/449 |

FOREIGN PATENT DOCUMENTS

| | | |
|---|---|---|
| JP | H03-269526 A | 12/1991 |
| JP | H04-172334 A | 6/1992 |
| JP | H07-261276 A | 10/1995 |
| JP | H11-248908 A | 9/1999 |
| JP | 2000-305177 A | 11/2000 |
| JP | 2004-177427 A | 6/2004 |
| JP | 2006-301588 A | 11/2006 |
| JP | 2008-076523 A | 4/2008 |

OTHER PUBLICATIONS

International Search Report for International Application No. PCT/JP2011/006983, issued by the Japanese Patent Office on Feb. 7, 2012.

Notice of First Office Action for Patent Application No. 201180074997.X, issued by the Chinese Intellectual Property Office on Apr. 22, 2015.

* cited by examiner

| | IMPRINTED SUBSTRATE FEATURES | | | CROSSTALK RATE(%) | |
|---|---|---|---|---|---|
| | HAZE | Ra | Rz | 0° | 60° |
| OPP FILM | 68.3 | 0.65 | 2.93 | 0.5 | 2.7 |
| PET SAND MAT | 76.9 | 0.14 | 0.85 | 4.7 | 22.2 |
| PET KNEADED MAT | 20.2 | 0.52 | 3.13 | 1.1 | 14.6 |

HAZE : DEGREE OF CLOUDING IN THE FILM OR MAT
Ra : ARITHMETIC AVERAGE OF SURFACE ROUGHNESS
Rz : TEN-POINT AVERAGE OF SURFACE ROUGHNESS

*FIG.17*

SCREEN AND SCREEN MANUFACTURING METHOD

The contents of the following PCT patent application are incorporated herein by reference: NO. PCT/JP2011/006983 filed on Dec. 14, 2011.

BACKGROUND

1. Technical Field

The present invention relates to a screen and a screen manufacturing method.

2. Related Art

A screen is known that reflects picture light projected from a projector or the like. In order to expand the viewing angle range, the screen may include a diffusing agent, such as shown in Patent Document 1. Furthermore, technology is known for providing a user with a stereoscopic image, by projecting picture light that has been polarized by a projector or the like onto a screen.

Patent Document 1: Japanese Patent Application Publication No. 2000-305177

However, in the case of a stereoscopic image formed by projecting polarized light onto the screen, since the screen includes the diffusing agent, the polarization characteristics of the picture light are changed by the diffusing agent and the stereoscopic image deteriorates.

SUMMARY

According to a first aspect of the present invention, provided is a screen comprising a substrate shaped as a flat board; a reflective layer made of metal arranged on one surface of the substrate; and an exposure layer that is arranged on a surface of the reflective layer facing away from the substrate, is optically isotropic and transparent with respect to visible light, and has bumps and depressions formed in an exposed surface thereof.

According to a second aspect of the present invention, provided is a screen manufacturing method comprising providing a reflective layer on a substrate shaped as a flat board; and forming an exposure layer on a surface of the reflective layer facing away from the substrate, the exposure layer being optically isotropic and transparent with respect to visible light and having bumps and depressions formed in an exposed surface thereof.

The summary clause does not necessarily describe all necessary features of the embodiments of the present invention. The present invention may also be a sub-combination of the features described above.

BRIEF DESCRIPTION OF THE DRAWINGS

FIG. 17 shows the experimental results regarding the relationship between the film of the embossing process and the crosstalk rate.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
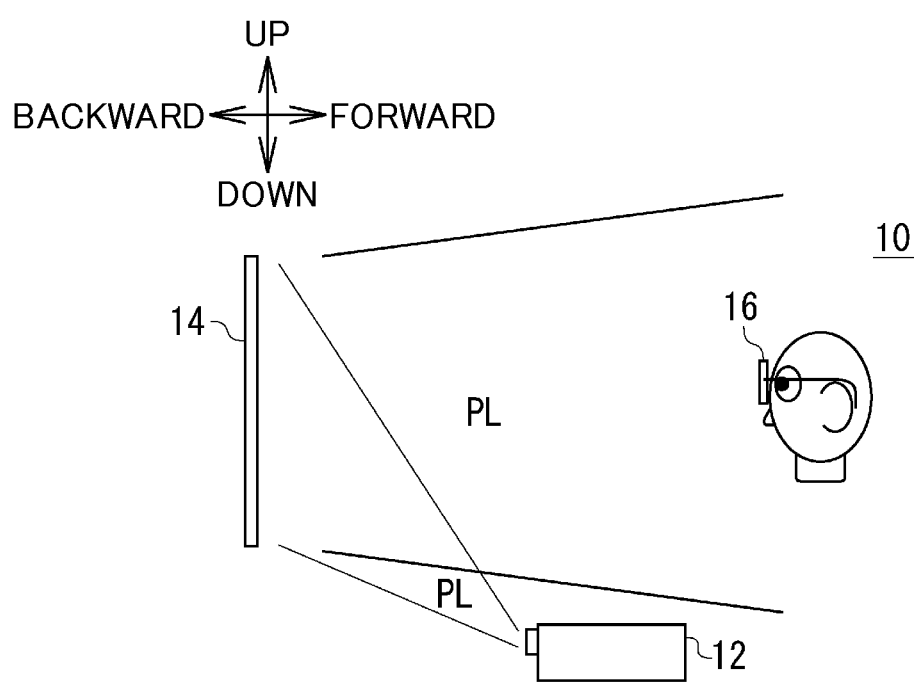
FIG. 1 shows an overall configuration of the a projector system 10.

FIG. 1 shows an overall configuration of a projector system 10. The up, down, forward, and backward directions indicated by the arrows in FIG. 1 indicate the up, down, forward, and backward directions of the projector system 10. The up, down, forward, and backward directions are the up, down, forward, and backward directions of the projector system 10 occurring during a normal usage state.

As shown in FIG. 1, the projector system 10 includes a projector 12 and a reflective screen 14. The projector 12 projects picture light PL, which forms a picture, onto the screen 14. The screen 14 reflects the picture light PL, which has right eye light and left eye light formed respectively by polarized light having different polarization characteristics, in the forward direction. As an example of the combination of polarization characteristics for the right eye and left eye picture light PL, there may be linearly polarized light that is polarized in the vertical direction and linearly polarized light that is polarized in the horizontal direction, or there may be circularly polarized light that is polarized in the right-handed direction and circularly polarized light that is polarized in the left-handed direction. A user views the picture light PL through polarized glasses 16 that include a right eye lens and a left eye lens, which have different polarization filters. In this way, the user can see the right eye picture light PL with their right eye and can see the left eye picture light PL with their left eye. The user can see a stereoscopic picture projected on the screen 14.

Figure 2:
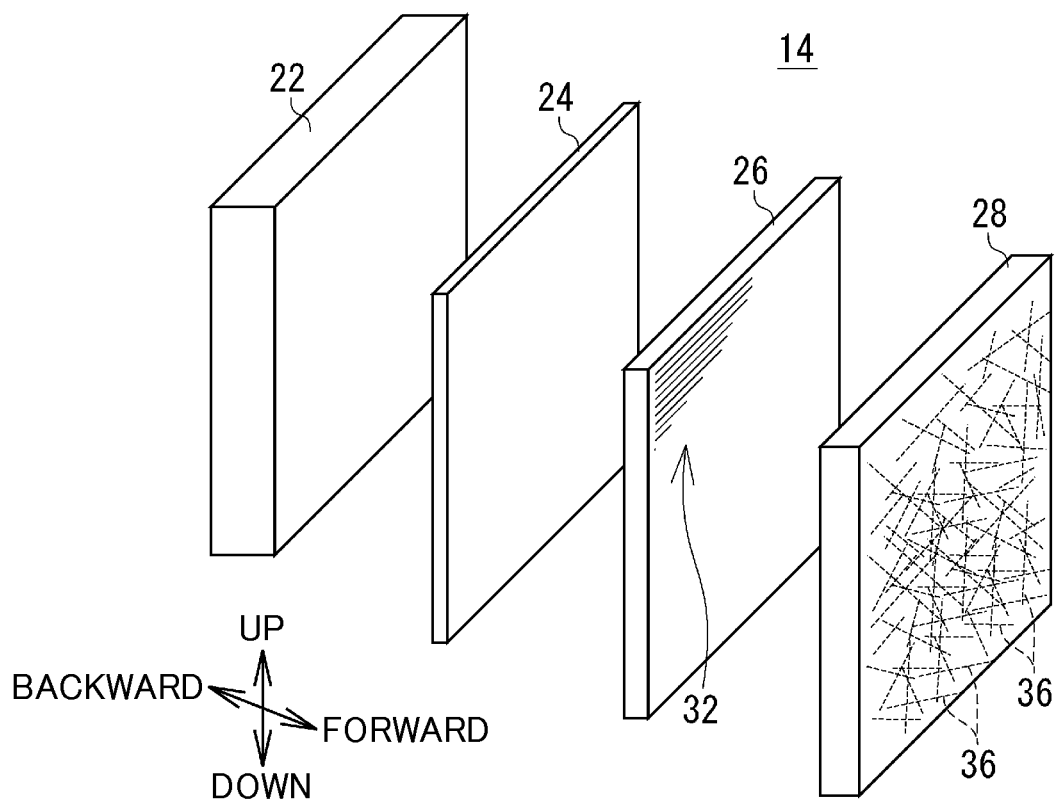
FIG. 2 is a perspective view of the screen 14.
Figure 3:
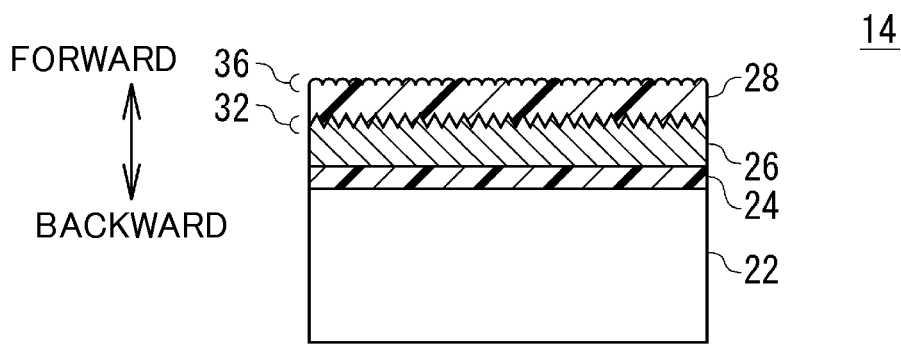
FIG. 3 is a cross-sectional view of the screen 14.

FIG. 2 is a perspective view of the screen 14. FIG. 3 is a cross-sectional view of the screen 14. As shown in FIGS. 2 and 3, the screen 14 includes a substrate 22, an adhesive layer 24, a reflective layer 26, and an exposure layer 28.

The substrate 22 is formed of a PET (polyethylene terephthalate) resin. The substrate 22 may be formed by a resin other than PET, such as a polycarbonate, polyethylene, polyethylene naphthalate, or vinyl chloride resin. The substrate 22 is formed as a flat rectangular board, as viewed from the front. The substrate 22 may have an 80-inch rectangular shape, for example. The screen 14 having this size can use a plurality of stacked substrates 22 as a substrate. The thickness of the substrate 22 may be 100 µm, for example, and in a case where there are a plurality of layers, substrates 22 with respective thicknesses of 100 µm and 75 µm, for example, can be stacked and combined.

The adhesive layer 24 adheres the reflective layer 26 to the substrate 22. The adhesive layer 24 is provided across the entire front surface of the substrate 22. The adhesive layer 24 is formed of a urethane-type adhesive material. The adhesive layer 24 may be selected as needed, as long as it is a material that can adhere the reflective layer 26. The thickness of the adhesive layer 24 is 5 µm.

The reflective layer 26 is arranged across the entire front surface of the substrate 22, with the adhesive layer 24 interposed therebetween. The reflective layer 26 is made from aluminum. The material of the reflective layer 26 can be soft aluminum foil. The reflective layer 26 may be formed of a material that can reflect light, or may be formed of other metals. The thickness of the reflective layer 26 is 7 µm.

Diffusion grooves 32 with recesses and protrusions are formed across the entire surface of the reflective layer 26 contacting the exposure layer 28, i.e. the front surface of the reflective layer 26. The diffusion grooves 32 have hairline shapes, and extend in the horizontal direction. The length of the diffusion grooves 32 in the horizontal direction is several micrometers. The pitch of the diffusion grooves 32 in the vertical direction is from 6 µm to 10 µm. The diffusion grooves 32 widen the viewing angle range, in the horizontal direction, of the picture light PL reflected by the reflective layer 26. In a case where the viewing angle range of the picture light PL is to be widened in the vertical direction, the diffusion grooves 32 may be formed to extend vertically.

The exposure layer 28 is optically isotropic and transparent and does not have birefringence, at least in the visible light region, which is the region of the picture light PL. As a result, the exposure layer 28 passes the picture light PL reflected by the reflective layer 26, without changing the polarization characteristics thereof. The exposure layer 28 is arranged across the entire surface of the reflective layer 26 that faces away from the substrate 22, i.e. the front surface of the reflective layer 26. The resin that forms the majority of the exposure layer 28 can be a urethane-type resin. The exposure layer 28 functions as a tint layer. The exposure layer 28 contains a coloring agent. The coloring agent contained in the exposure layer 28 is formed of a black dye. A black pigment can be used as the coloring agent. As a result, the exposure layer 28 decreases the variation in the polarization characteristics, while absorbing polarized light whose phase has been disturbed by multiple reflections.

The thickness of the exposure layer 28 is 10 µm. Bumps and depressions 36 are formed by performing embossing on the front surface of the exposure layer 28, i.e. the exposed surface of the exposure layer 28. With these bumps and depressions 36, the picture light PL is emitted across a wider direction range, thereby widening the viewing angle range.

Figure 4:
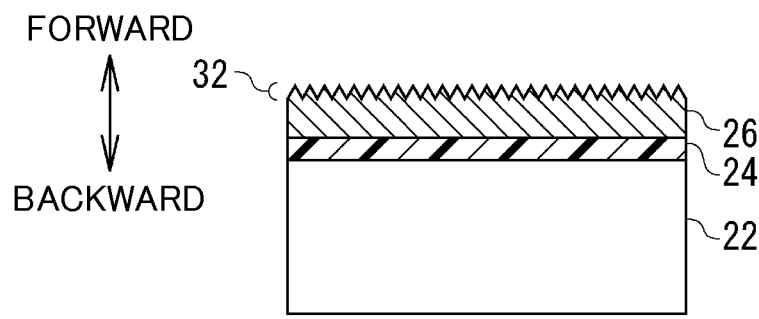
FIG. 4 shows a stage in the manufacturing process of the screen 14.
Figure 5:
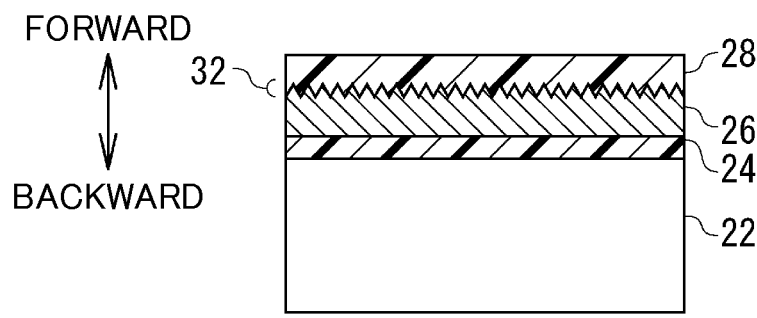
FIG. 5 shows a stage in the manufacturing process of the screen 14.
Figure 6:
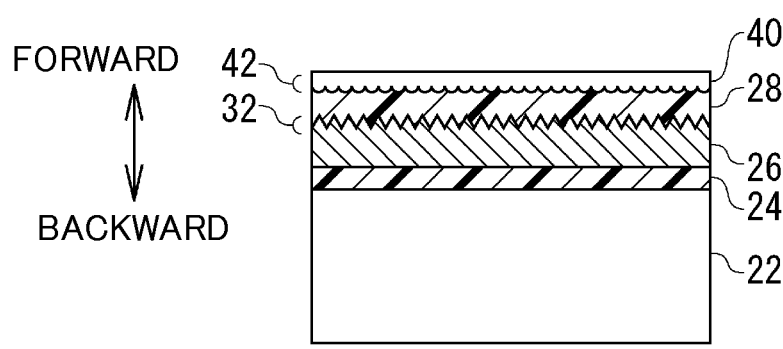
FIG. 6 shows a stage in the manufacturing process of the screen 14.

The following describes an exemplary process for manufacturing the screen 14. FIGS. 4 to 6 show each stage in the manufacturing process of the screen 14.

As shown in FIG. 4, during the reflective layer placement stage, a urethane-type adhesive agent is applied to the flat substrate 22 formed of PET with a thickness of 100 µm, using roller coating, and then dried to form the adhesive layer 24 with a thickness of 5 µm. After this, aluminum foil that is to serve as the reflective layer 26 is mounted on one surface of the adhesive layer 24. Next, the adhesive layer 24 is hardened, thereby adhering the reflective layer 26 to the substrate 22 with the adhesive layer 24 interposed therebetween. The diffusion grooves 32 formed on the front surface of the reflective layer 26 may be formed either before or after the reflective layer 26 is adhered to the substrate 22. The method for forming the diffusion grooves 32 can include simultaneously rolling two sheets of aluminum foil and then peeling off these sheets of aluminum foil.

Next, as shown in FIG. 5, during the exposure layer formation step, a resin compound that is formed by blending a urethane-type resin and a black dye is applied to the front surface of the reflective layer 26, through casting, in a manner to have a thickness of 10 µm after drying. One example of the resin compound applied here is a mixture containing 100 parts of a polyol-type main agent, 28 parts of an isocyanate-type hardening agent, 100 parts of a diluting solvent, and a suitable amount of black dye. The black dye may be suitably blended according to the gain intended by the design. After this, the resin compound is dried and the exposure layer 28, which is optically isotropic and transparent with respect to visible light, is formed on the front surface of the reflective layer 26, which is the surface facing away from the substrate 22.

Next, as shown in FIG. 6, an embossing film 40 formed by a film made of biaxially oriented polypropylene (OPP) with a thickness of 20 µm is attached across the entire front surface of the exposure layer 28. An embossed surface 42, which includes bumps and depressions formed by embossing, is formed on the attachment surface of the embossing film 40. In this state, the total thickness of the substrate 22, the adhesive layer 24, and the reflective layer 26 is 112 µm, the thickness of the exposure layer 28 is 10 µm, and the thickness of the embossing film 40 is 20 µm. After this, an etching process is performed on the exposure layer 28, and then the embossing film 40 is peeled off. In this way, the bumps and depressions of the embossed surface 42 of the embossing film 40 are imprinted to the front surface, i.e. the exposed surface, of the exposure layer 28, thereby forming the bumps and depressions 36. As a result, the screen 14 shown in FIG. 3 is completed.

The following describes the operation and effect of the screen 14 described above. When the picture light PL having two polarization directions output from the projector 12 reaches the screen 14, the picture light PL is incident to the exposure layer 28. The picture light PL passes through the exposure layer 28, and then reaches the reflective layer 26. The picture light PL that has reached the reflective layer 26 is reflected and then progresses forward. Since the diffusion grooves 32 extending horizontally are formed in the front surface of the reflective layer 26, the picture light PL is reflected in a manner that widens the progression direction in the horizontal direction. After this, the picture light PL enters the exposure layer 28.

Within the picture light PL, a portion of light that has been diffused and reflected by the diffusion grooves 32 experiences multiple reflections within the exposure layer 28 and becomes stray light, and it is believed that this stray light is absorbed by the black dye. On the other hand, within the picture light PL, the portion of picture light PL that is correctly reflected by the diffusion grooves 32 and does not experience disturbed polarization is not absorbed by the black dye within the exposure layer 28, and the majority of this light is believed to be passed and emitted.

Furthermore, the picture light PL output from the front surface of the exposure layer 28 widens in the progression direction while maintaining its polarization characteristics, due to the bumps and depressions 36 formed by the embossing. In this way, the user can see the picture light PL maintaining its polarization characteristics in a wide region in front of the screen 14, and therefore the crosstalk rate can be decreased. Furthermore, since the bumps and depressions 36 of the exposure layer 28 are formed, the change in gain that accompanies a change in the viewing angle can be decreased. In other words, the change in the gain relative to the viewing angle can be decreased. As a result, the screen 14 can provide the user with a high-quality stereoscopic image while reducing the change in brightness relative to the viewing angle in a horizontally wide region. Furthermore, by widening the viewing angle range, the screen 14 can restrict brightness irregularities such as hot spots and scintillation.

Figure 7:
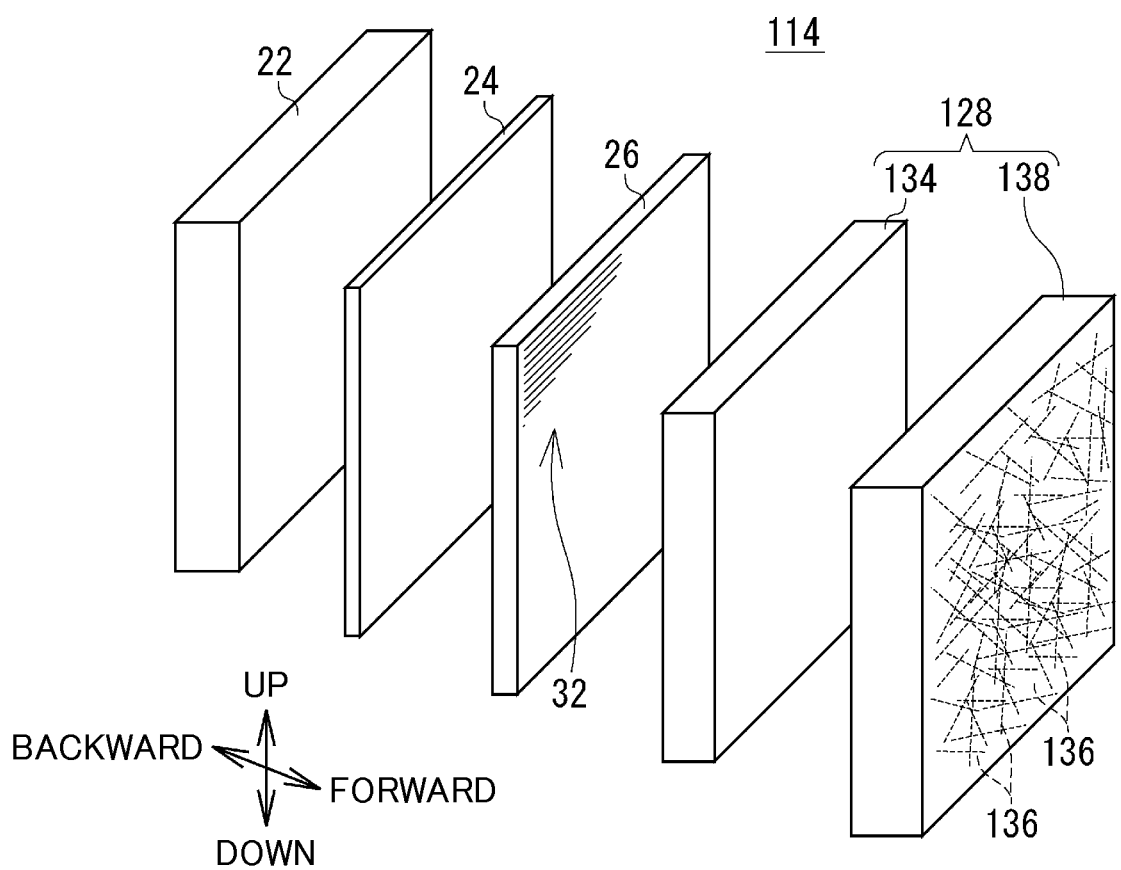
FIG. 7 is an exploded perspective view of a screen 114 having a modified exposure layer 128.
Figure 8:
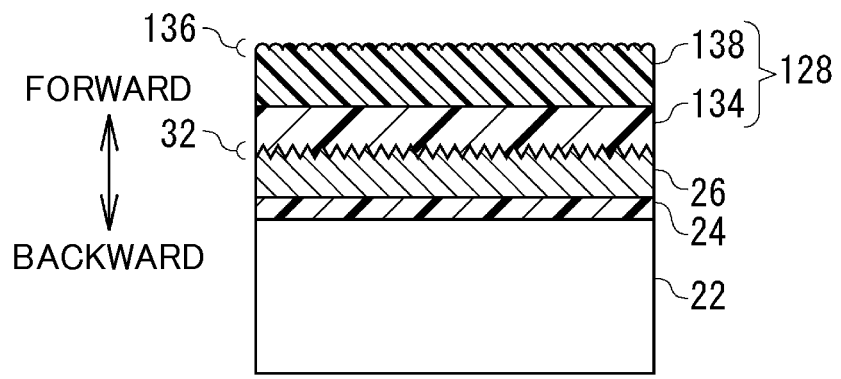
FIG. 8 is a cross-sectional view of the screen 114.

The following describes an embodiment in which the exposure layer 28 described above has been modified. FIG. 7 is an exploded perspective view of a screen 114 having a modified exposure layer 128. FIG. 8 is a cross-sectional view of the screen 114. As shown in FIGS. 7 and 8, the screen 114 includes the substrate 22, the adhesive layer 24, the reflective layer 26, and the exposure layer 128. The exposure layer 128 includes a tint layer 134 and a surface layer 138.

The material forming the tint layer 134 is the same as that of the exposure layer 28 functioning as the tint layer described above. The tint layer 134 is arranged on the reflective layer 26 side in the exposure layer 128. The tint layer 134 is provided across the entire front surface of the reflective layer 26. The thickness of the tint layer 134 is 25 μm. The front surface of the tint layer 134 is flat. The tint layer 134 is formed of a resin in which the main component is a urethane-type resin containing a coloring agent.

The surface layer 138 is arranged across the entire front surface of the tint layer 134, i.e. the surface of the tint layer 134 that faces away from the reflective layer 26. The surface layer 138 is exposed to the outside. The surface layer 138 is formed of UV-curable resin. Embossing is performed on the entire front surface of the surface layer 138, i.e. the front surface of the exposure layer 128. In this way, the bumps and depressions 136 are formed on the front surface of the surface layer 138. Due to the bumps and depressions 136, the emission direction range of the picture light PL is widened, thereby widening the viewing angle range.

In the present embodiment, the surface layer 138 is formed on the front surface of the tint layer 134, and therefore restricts degradation of the tint layer 134.

Figure 9:
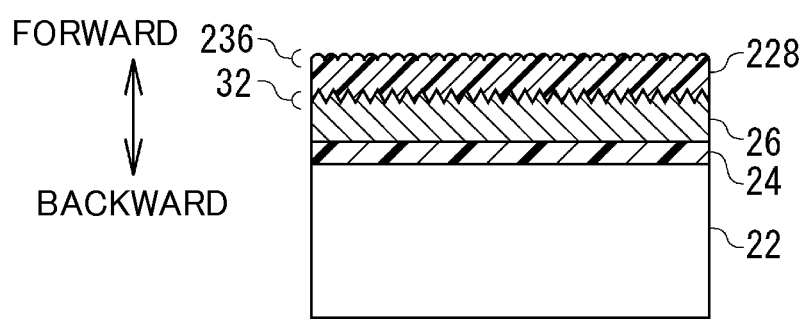
FIG. 9 is a cross-sectional view of a screen 214 that has a modified exposure layer 228.

FIG. 9 is a cross-sectional view of a screen 214 that has a modified exposure layer 228. The screen 214 includes the substrate 22, the adhesive layer 24, the reflective layer 26, and the exposure layer 228.

The exposure layer 228 is optically isotropic and transparent and does not have birefringence. The exposure layer 228 is made of a transparent resin. The exposure layer 228 is provided across the entire front surface of the reflective layer 26. The exposure layer 228 is formed of a urethane-type resin. The exposure layer 228 does not include a coloring agent, and is substantially uncolored. The exposure layer 228 has a thickness of approximately 10 μm. Bumps and depressions 236 are formed on the entire front surface of the exposure layer 228, through embossing.

Figure 10:
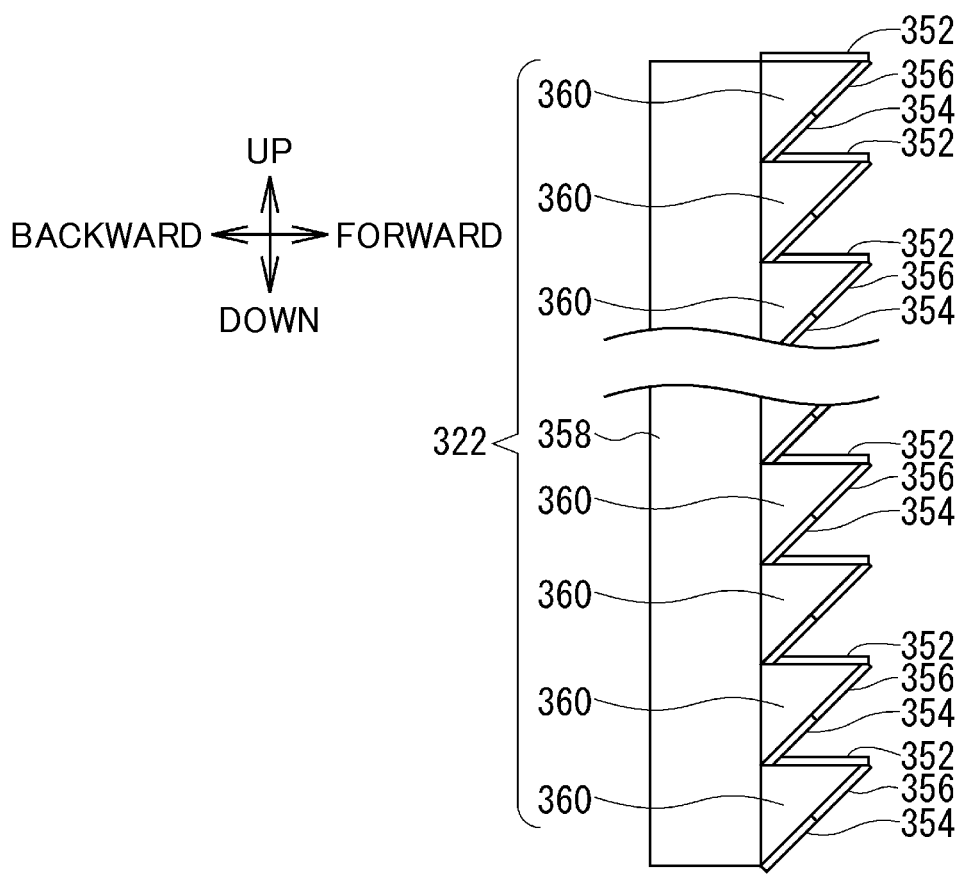
FIG. 10 is a vertical cross-sectional view of a screen 314 having a plurality of prism sections 360.

FIG. 10 is a vertical cross-sectional view of a screen 314 having a plurality of prism sections 360. The following describes the screen 314 having the plurality of prism sections 360. As shown in FIG. 10, the screen 314 includes a substrate 322, an upper light absorbing layer 352, a lower light absorbing layer 354, and a layered component 356. It should be noted that the lower light absorbing layer 354 may be omitted.

The substrate 322 includes a base portion 358 and the plurality of prism sections 360.

The base portion 358 is formed as a flat rectangular surface, as seen from the front. For example, the base portion 358 may be an 80-inch rectangle. The material forming the base portion 358 may be urethane resin, acrylic resin, epoxy resin, polycarbonate resin, polyester resin, styrene resin, or acrylic styrene copolymer resin.

The prism sections 360 are arranged on the front surface of the substrate 322, which is the front surface of the base portion 358. The prism sections 360 are made of a urethane resin containing carbon black that functions as a light absorbing material. The prism sections 360 are formed as triangular pillars that extend linearly in the horizontal direction. The height of each prism section 360 in the backward/forward direction may be from 70 μm to 200 μm, for example. The length of each prism section 360 in the horizontal direction is equal to the length of the base portion 358 in the horizontal direction. The prism sections 360 are provided across the entire length of the base portion 358 in the horizontal direction. The prism sections 360 are arranged parallel to each other. The prism sections 360 are arranged periodically in the vertical direction. The pitch of the prism sections 360 in the vertical direction is from 100 μm to 300 μm, for example. The prism sections 360 are impression molded using a mold or the like.

The upper light absorbing layer 352, the lower light absorbing layer 354, and the layered component 356 are arranged in different regions on the outer surface of each prism section 360.

Figure 11:
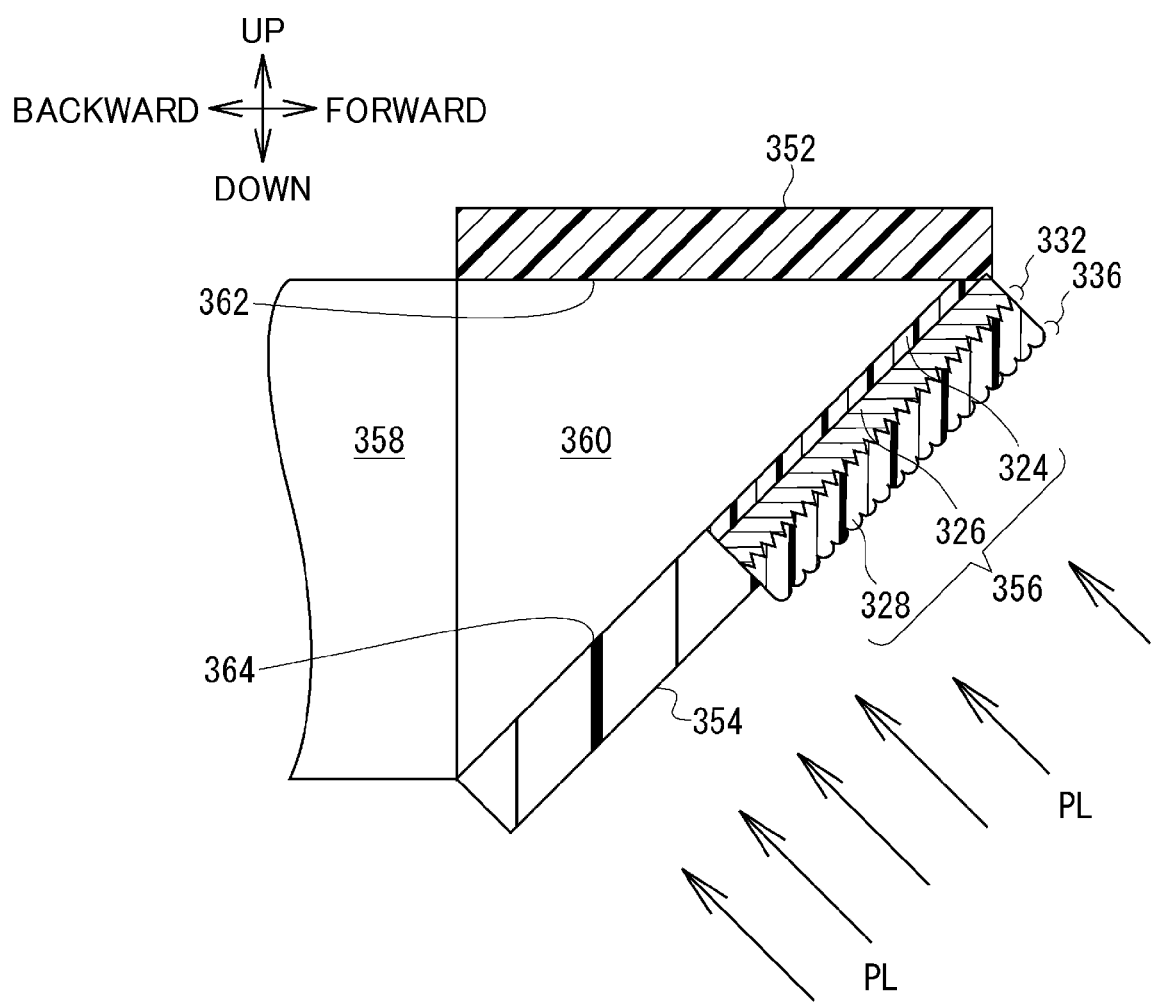
FIG. 11 is an enlarged cross-sectional view of a prism section 360.

FIG. 11 is an enlarged cross-sectional view of a prism section 360. As shown in FIG. 11, the outer surface of the prism section 360 includes a top surface 362 and a bottom surface 364.

The top surface 362 is formed with a flat rectangular shape. The top surface 362 is arranged above the bottom surface 364. The top surface 362 may be parallel to the normal line of the base portion 358, or may be inclined downward from the normal line of the base portion 358 as seen from the base portion 358. The top surface 362 faces upward.

The bottom surface 364 is formed with a flat rectangular shape. The bottom surface 364 is arranged below the top surface 362. The bottom surface 364 is arranged upstream of the top surface 362 in the progression direction of the picture light PL. The bottom surface 364 and the top surface 362 are oriented to intersect each other. The bottom surface 364 is inclined upward from the normal line of the base portion 358, as seen from the base portion 358. In this way, the bottom surface 364 faces forward and downward.

The upper light absorbing layer 352 is arranged on the entire top surface 362 of each prism section 360. Instead, the upper light absorbing layer 352 may be formed on a portion of the top surface 362. The upper light absorbing layer 352 includes a urethane resin containing carbon black. The upper light absorbing layer 352 absorbs the visible light that reaches the top surface 362. The thickness of the upper light absorbing layer 352 may be from 5 μm to 10 μm, for example.

The lower light absorbing layer 354 is arranged from the bottom end to a middle portion of the bottom surface 364 of each prism section 360. The lower light absorbing layer 354 is formed across the entire length of each prism section 360 in the horizontal direction. The material forming the lower light absorbing layer 354 and the thickness of the lower light absorbing layer 354 are each the same as that of the upper light absorbing layer 352. It should be noted that the lower light absorbing layer 354 may be thinner than the layered component 356. The lower light absorbing layer 354 absorbs the visible light that reaches the lower light absorbing layer 354.

The layered component 356 is arranged on the bottom surface 364 of each prism section 360, in a region where the lower light absorbing layer 354 is not formed. Specifically, the layered component 356 is formed on the bottom surface 364 in a region from the front end of the lower light absorbing layer 354 to the peak of the prism section 360. The layered component 356 includes an adhesive layer 324, a reflective layer 326, and an exposure layer 328 functioning as the tint layer, which are stacked sequentially.

The adhesive layer 324 is formed on the region of the bottom surface 364 that is exposed. The reflective layer 326 is layered on the surface of the adhesive layer 324 that faces away from the prism section 360. The diffusion grooves 332 are formed on the surface of the reflective layer 326 that faces away from the prism section 360, i.e. the front surface of the reflective layer 326. The exposure layer 328 is layered on the surface of the reflective layer 326 that faces away from the prism section 360. The bumps and depressions 336 are formed on the surface of the exposure layer 328 that faces away from the prism section 360, i.e. the front surface of the exposure layer 328, through embossing. The thickness and material of each of the adhesive layer 324, the reflective layer 326, and the exposure layer 328 are the same as those of the adhesive layer 24, the reflective layer 26, and the exposure layer 28.

The picture light PL is projected onto the screen 314 from the projector 12, which is arranged in front of and above the screen 314. Within the picture light PL, the picture light PL that reaches the lower light absorbing layer 354 is absorbed by the lower light absorbing layer 354. On the other hand, within the picture light PL, the picture light PL that reaches the layered component 356 passes through the exposure layer 328 and reaches the diffusion grooves 332 on the front surface of the reflective layer 326. This picture light PL is reflected with a progression direction that is widened in the horizontal direction, by the diffusion grooves 332. In this way, the majority of the picture light PL progresses forward in a wider range in the horizontal direction. The picture light PL progressing substantially forward is not significantly absorbed by the black dye of the exposure layer 328, experiences an expanded progression direction due to the bumps and depressions 336 of the exposure layer 328, and is output from the front surface of the exposure layer 328. On the other hand, a portion of the picture light PL is reflected downward instead of forward by the reflective layer 326, and is absorbed by the upper light absorbing layer 352 of the adjacent prism section 360. In this way, the picture light PL with significantly changed progression direction and polarization characteristics does not reach the user in a significant amount, and therefore the crosstalk rate can be decreased. As a result, the screen 314 can provide a high quality stereoscopic image.

Figure 12:
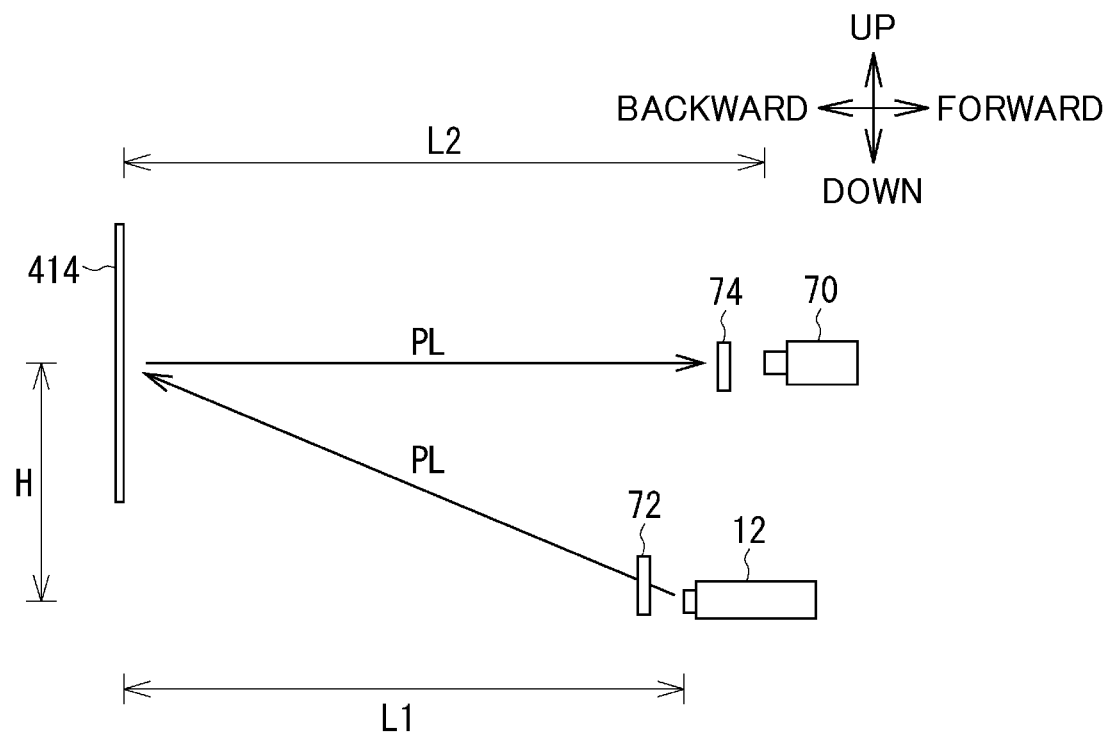
FIG. 12 is a schematic view for describing the experiment of measuring the cross talk rate.

The following describes the effect of the present embodiment reducing the crosstalk rate, and an experiment conducted in order to prove the averaging of the gain. FIG. 12 is a schematic view for describing the experiment of measuring the crosstalk rate. As shown in FIG. 12, this experiment included projecting a picture from a projector 12 onto a screen 414, and measuring the brightness on the screen 414 with a brightness photometer 70. The following describes the specific shape and arrangement of each component.

The screen 414 had a rectangular shape, with a horizontal dimension of 1040 mm and a vertical dimension of 770 mm. The projector 12 used was a DLP (Registered Trademark) projector manufactured by NEC Corporation. A personal computer was used to input into the projector 12 a signal causing a completely white image do be displayed. The brightness photometer 70 used was a BM-7 manufactured by TOPCON Corporation. The brightness measurement angle for the brightness photometer 70 was set to 1.0°.

The horizontal distance L1 between the projector 12 and the screen 414 was 2000 mm. The horizontal distance L2 between the brightness photometer 70 and the screen 414 was 2500 mm. The vertical distance, i.e. the height H, between the projector 12 and the screen 414 was 620 mm. The center of the light receiving surface of the brightness photometer 70 was at the same height as the center of the screen 414.

A polarization plate 72 was arranged between the projector 12 and the screen 414. The polarization plate 72 has a vertical transmission axis. A polarization plate 74 was arranged between the brightness photometer 70 and the screen 414. With the polarization plate 74 having a transmission axis arranged to be parallel, in the same manner as that of the polarization plate 72, and then arranged to have a cross Nichol configuration in which the transmission axis is orthogonal to that of the polarization plate 72, the brightness of the center of the screen 414 was measured using the brightness photometer 70. As a result, the crosstalk rate was calculated as shown by Expression 1.

$$\text{(crosstalk rate)} = \text{(white screen brightness for cross Nichol configuration)} / \text{(white screen brightness for parallel configuration)} \quad \text{Expression 1:}$$

Furthermore, the crosstalk rate for each viewing angle was calculated by measuring the brightness while rotating the brightness photometer 70 in a horizontal plane around the center of the screen 414.

Figure 13:
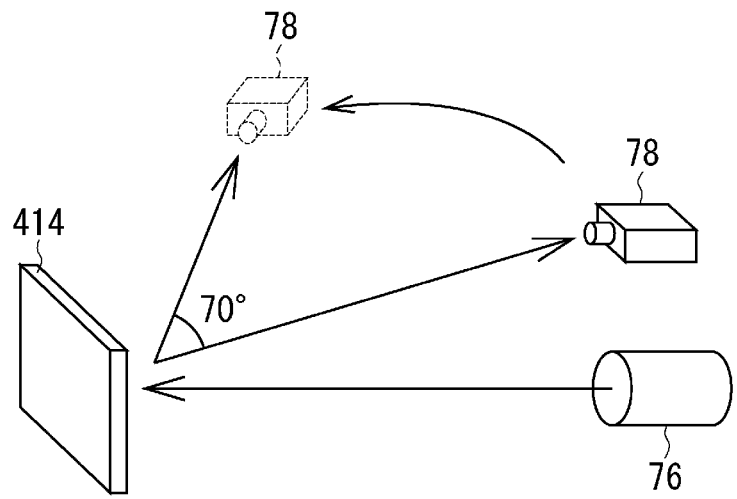
FIG. 13 is a schematic view for describing the experiment for measuring the gain.

FIG. 13 is a schematic view for describing the experiment for measuring the gain. As shown in FIG. 13, the gain measurement is performed using a light source 76 and a goniophotometer 78.

Plane wave light from the fixed light source 76 was radiated onto the screen 414, and the intensity of the reflected light was measured using a goniophotometer 78. The goniophotometer 78 used was a GP-200 manufactured by Murakami Color Research Laboratory Co., Ltd. The goniophotometer 78 measured the light intensity while being rotated in a horizontal plane around the center of the screen 414. Specifically, with the normal line of the screen 414 set as 0°, the light intensity was measured while rotating the goniophotometer 78 up to 70°. The reference for the gain was a value of "1" for the light intensity measured when a reference material was used.

Samples of a first embodiment, a second embodiment, and a first comparative example were manufactured to undergo the crosstalk rate and gain measurements. The first embodiment includes a layered structure that is the same as the screen 14 having the exposure layer 28 functioning as the tint layer described above. In the first embodiment, the substrate 22, the adhesive layer 24, the reflective layer 26, and the exposure layer 28 have respective thicknesses of 100 μm, 5 μm, 7 μm, and 10 μm. The second embodiment includes a layered structure that is the same as the screen 214 having the exposure layer 228 made of a transparent resin described above. In the second embodiment, the substrate 22, the adhesive layer 24, the reflective layer 26, and the exposure layer 228 have respective thicknesses of 100 μm, 5 μm, 7 μm, and 10 μm.

Figure 14:
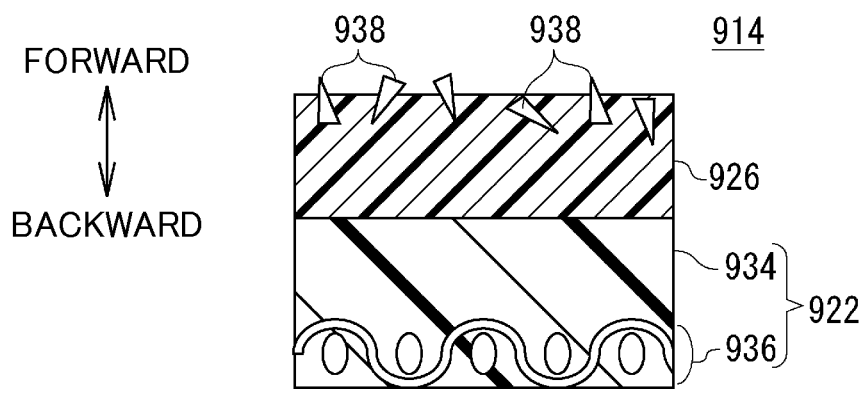
FIG. 14 is a cross-sectional view of a screen 914 of the first comparative example.

FIG. 14 is a cross-sectional view of a screen 914 of the first comparative example. As shown in FIG. 14, the screen 914 of the first comparative example includes a substrate 922 and a reflective layer 926. The substrate 922 has a thickness of 1 mm to 2 mm. The substrate 922 includes a resin layer 934 and a cloth portion 936. The resin layer 934 is made of polyvinyl chloride (PVC). The cloth portion 936 is provided on the back surface of the resin layer 934. The cloth portion 936 includes polyester fibers that are braided in two directions orthogonal to each other. The reflective layer 926 is made of a resin coated in silver. The reflective layer 926 contains an aluminum filler 938. The reflective layer 926 has a thickness of 3 μm.

Figure 15:
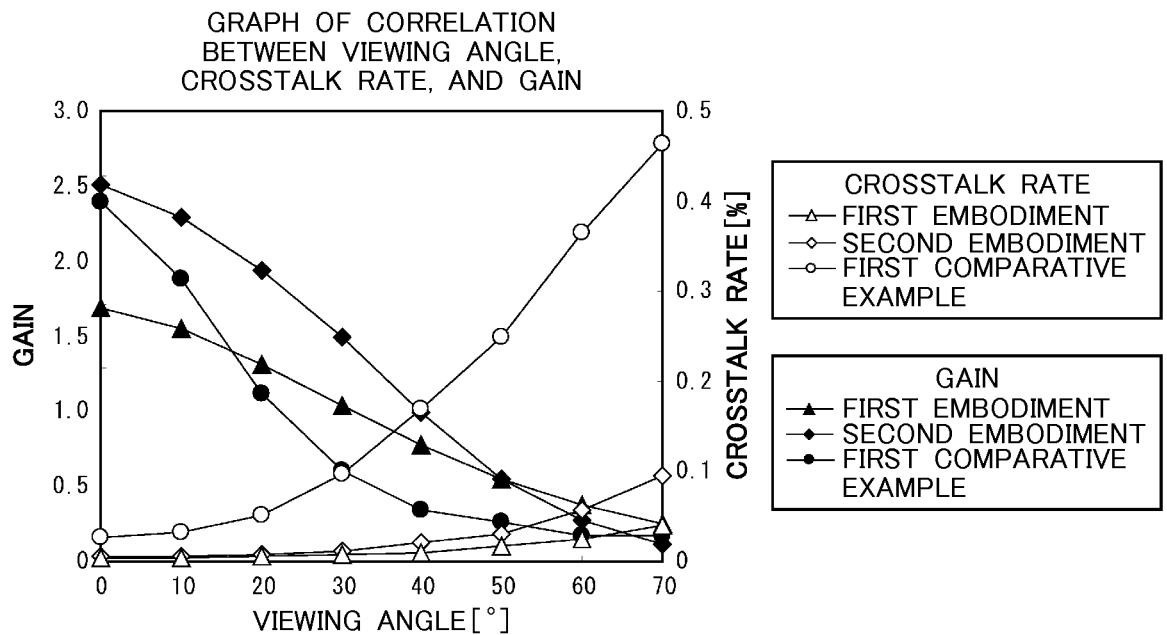
FIG. 15 is a graph of the measurement results for the crosstalk rate and the gain.

FIG. 15 is a graph of the measurement results for the crosstalk rate and the gain. As shown in FIG. 15, the crosstalk rates for the first embodiment and second embodiment are lower than the crosstalk rate of the first comparative example. In particular, it is understood that the crosstalk rate difference between the first and second embodiments and the first comparative example increases greatly along with an increase in the viewing angle. When the crosstalk rates of the first embodiment and second embodiment are compared to each other, it is understood that the first embodiment having the exposure layer 28 that functions as the tint layer has a lower crosstalk rate than the second embodiment.

Furthermore, when the gain of first and second embodiments are compared to the gain of the first comparative example, it is understood that, aside from in a small portion of the viewing angle range, the gain of the first comparative example is less than the gain of the first and second embodiments. In particular, compared to the first comparative example, the second embodiment has higher gain at substantially all viewing angles. Furthermore, compared to the first comparative example, the first embodiment has a lower rate of change in the gain relative to change in the viewing angle. In other words, compared to the first comparative example, the first embodiment can provide an image of substantially the same brightness to a user at any position, without being dependent on the position of the user.

Figure 16:
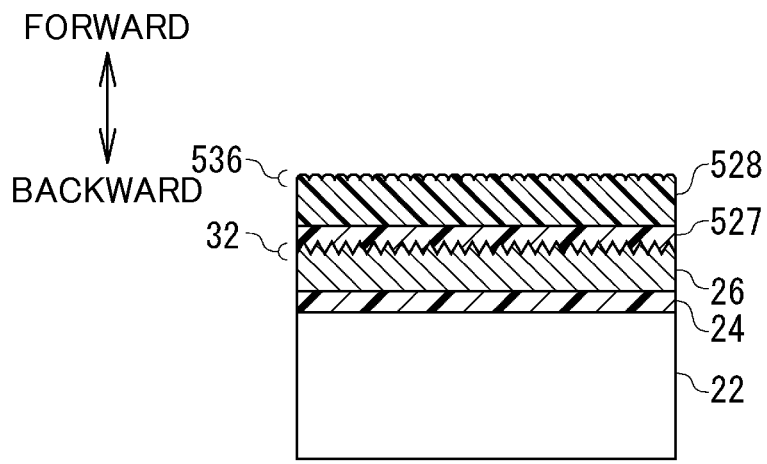
FIG. 16 is a cross-sectional view of a screen 514 that is a sample in the embossing experiment.

The following describes an experiment for proving the effect of decreasing the crosstalk by applying an embossing process using an OPP film. FIG. 16 is a cross-sectional view of a screen 514 that is a sample in the embossing experiment. As shown in FIG. 16, the screen 514 includes the substrate 22, the adhesive layer 24, the reflective layer 26 a primer layer 527, and an exposure layer 528. The exposure layer 528 functions as a surface layer made of UV-curable resin. The front surface of the exposure layer 528 has bumps and depressions 536 formed thereon. In this experiment, the bumps and depressions 536 were made through an embossing process using embossing films respectively made of an OPP film, a PET sand mat, and a PET kneaded mat, and the crosstalk rate was investigated. The PET sand mat used was manufactured by Kaisei Industry Co., ltd. The kneaded mat PET used was X44 manufactured by Toray Industries Co., ltd.

FIG. 17 shows the experimental results regarding the relationship between the film of the embossing process and the crosstalk rate. Here, Rz is a value obtained by calculating, in a range of a given reference length, the sum of the height difference between an average line and the roughness curve for each of the five highest mountains and the sum of the height difference between the average line and the roughness curve for each of the five lowest valleys, adding these two sums together, and then dividing the resulting value by 5. The value of 0° for the crosstalk rate indicates the direct front surface of the screen 514, i.e. the position directly in front, and the value of 60° indicates a direction that is rotated by 60° in a horizontal plane from the center of the screen 514.

As shown in FIG. 17, the crosstalk rate of the screen 514 in which the bumps and depressions 536 are formed by an OPP film is quite excellent when compared to that of the PET sand mat and the PET kneaded mat for both 0° and 60°.

The shapes, numerical values, materials, and arrangements of the configurations described in each of the above embodiments may be changed as desired.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A screen comprising:
    a substrate;
    a reflective layer made of metal arranged on one surface of the substrate; and
    an exposure layer that is arranged on a surface of the reflective layer facing away from the substrate, is optically isotropic and transparent with respect to visible light, and has bumps and depressions formed in an exposed surface thereof, the bumps and depressions giving the exposure layer an arithmetic average surface roughness of about 0.65 μm, a ten-point average surface roughness of about 2.93 μm, and a haze of about 68.3%.

2. The screen according to claim 1, wherein the exposure layer is formed by casting a urethane-type resin.

3. The screen according to claim 1, wherein the exposure layer includes a tint layer that is arranged on the reflective layer side thereof, and a surface layer that is arranged on a surface of the tint layer facing away from the reflective layer and is exposed to outside.

4. The screen according to claim 1, wherein bumps and depressions are formed on a surface of the reflective layer contacting the exposure layer.

5. The screen according to claim 1, wherein the substrate includes a plurality of prism sections, and the reflective layer and the exposure layer are arranged on a surface of each prism section that faces one direction.

6. The screen according to claim 5, wherein a light absorbing layer that absorbs visible light is arranged on a surface of each prism section that faces another direction.

7. An apparatus comprising:
    a base layer;
    a metallic layer on a surface of the base layer; and
    a transparent layer on a surface of the reflective layer opposite the base layer, the transparent layer being optically isotropic and increasing an emission direction range of a light reflected by the metallic layer;
    wherein the transparent layer includes bumps and depressions formed on a surface opposite the reflective layer, the bumps and depressions giving the exposure layer an arithmetic average surface roughness of about 0.65 μm, a ten-point average surface roughness of about 2.93 μm, and a haze of about 68.3%.

8. The apparatus according to claim 7, wherein the transparent layer includes a urethane-type resin.

9. The apparatus according to claim 7, wherein the transparent layer includes a tint layer arranged next to the metallic layer.

10. The apparatus according to claim 7, wherein bumps and depressions are formed on a surface of the metallic layer contacting the transparent layer.

11. The apparatus according to claim 7, wherein the base layer includes a plurality of prism sections, and the metallic layer and the transparent layer are arranged on a first surface of each prism section that faces a first direction.

12. The apparatus according to claim 11, further comprising a light absorbing layer arranged on a second surface of each prism section that faces a second direction.

* * * * *